US009144861B2

(12) United States Patent
Sokol et al.

(10) Patent No.: US 9,144,861 B2
(45) Date of Patent: Sep. 29, 2015

(54) APPARATUS FOR LASER PEENING HIDDEN SURFACES

(75) Inventors: David W. Sokol, Dublin, OH (US); Jeff L. Dulaney, Delaware, OH (US); Nickolas K. McCoy, Lewis Center, OH (US)

(73) Assignee: LSP Technologies, Inc., Dublin, OH (US)

( * ) Notice: Subject to any disclaimer, the term of this patent is extended or adjusted under 35 U.S.C. 154(b) by 292 days.

(21) Appl. No.: 13/487,212

(22) Filed: Jun. 3, 2012

(65) Prior Publication Data
US 2012/0325788 A1 Dec. 27, 2012

Related U.S. Application Data

(60) Provisional application No. 61/492,830, filed on Jun. 3, 2011.

(51) Int. Cl.
B23K 26/06 (2014.01)
B23K 26/00 (2014.01)
B23K 26/08 (2014.01)
B23K 26/18 (2006.01)

(52) U.S. Cl.
CPC ........... B23K 26/0069 (2013.01); B23K 26/009 (2013.01); B23K 26/0648 (2013.01); B23K 26/0884 (2013.01); B23K 26/18 (2013.01)

(58) Field of Classification Search
CPC ............ C21D 10/005; B23K 26/0639; B23K 26/0648; B23K 26/0069; B23K 26/009; B23K 26/0096; B23K 26/0884; B23K 26/18
USPC .............................. 219/121.6, 121.85, 121.75
See application file for complete search history.

(56) References Cited

U.S. PATENT DOCUMENTS

2002/0021831 A1* 2/2002 Dulaney et al. ............... 382/152
2005/0120803 A1* 6/2005 Sokol et al. ..................... 73/801
2006/0021409 A1* 2/2006 Tenaglia et al. .................. 72/53
2007/0262063 A1* 11/2007 Sano et al. ............... 219/121.85

* cited by examiner

Primary Examiner — Tu B Hoang
Assistant Examiner — Michael Hoang
(74) Attorney, Agent, or Firm — Benesch, Friedlander, Coplan & Aronoff LLP; Benjamen E. Kern; Christopher H. Bond

(57) ABSTRACT

Methods, systems, and apparatuses are disclosed for laser peening hidden surfaces. In one embodiment, a laser processing pen is provided, the laser processing pen comprising: an elongated member, comprising: a laser pulse entry portion; a laser pulse exit portion, wherein the laser pulse exit portion includes at least one optical lens; and at least one tape guide capable of channeling at least a non-adhesive tape overlay in proximity of the laser pulse exit portion.

20 Claims, 3 Drawing Sheets

APPARATUS FOR LASER PEENING HIDDEN SURFACES

CROSS-REFERENCE TO RELATED APPLICATIONS

This application claims priority from U.S. Provisional Patent Application No. 61/492,830, filed on Jun. 3, 2011, which is incorporated by reference herein in its entirety.

STATEMENT REGARDING FEDERALLY FUNDED RESEARCH AND DEVELOPMENT

The United States Government has rights in this invention pursuant to Contract No. FA 8650-08-C-5303 between the United States Air Force and the assignee, LSP Technologies, Inc.

BACKGROUND

Laser peening (also known as laser shock processing or laser shock peening) is an innovative surface treatment for improving the fatigue strength and damage tolerance of metal parts. Laser peening drives high amplitude shock waves into a part surface using high intensity laser pulses. The shock waves are used to develop deep compressive residual stresses in the surfaces of fatigue-prone parts. Typically, these stresses penetrate five to ten times deeper than conventional metal shot peening. These compressive surface stresses inhibit the initiation and propagation of fatigue cracks.

Laser peening has been particularly effective at preventing fatigue failures in aircraft engine metal alloy fan and compressor blades. However, the application of laser peening is much broader. The application can encompass aerospace structures, helicopter gears and propulsion components, automotive parts, orthopedic implants, tooling and dies, and numerous other military and industrial parts prone to metal fatigue failures.

Before laser peening, an overlay coating, which may be substantially opaque to the laser beam, may be applied to the part surface being treated. An additional layer, which may be substantially transparent to the laser beam, may be placed over the opaque overlay. The transparent layer may also be applied directly to the part surface, without the application of an opaque layer. The opaque overlay may be, for example, black paint, or tape. The transparent overlay may be, for example, flowing water.

Suitable laser peening systems, apparatuses, and processing conditions are disclosed in, for example, one or more of U.S. Pat. Nos. 5,741,559, 6,191,385, 6,373,876, and 7,268,317, each of which is incorporated by reference in its entirety.

The laser pulses pass through the transparent overlay and strike the opaque overlay, causing the opaque overlay to vaporize. The vapor absorbs the remaining laser energy and produces a rapidly expanding plasma plume. Because the expanding plasma is confined momentarily between the surface of the part and the transparent overlay, a rapidly rising high-pressure shock wave is created, which propagates into the part. When the peak stress created by the shock wave is above the dynamic yield strength of the metal part, the metal yields, and the metal is "cold worked" or plastically deformed on, and just under, the surface. This plastic deformation results in compressive residual stresses in the surface of the part. The depth and magnitude of the residual stresses depend upon the magnitude and rate of attenuation of the shock wave as it passes through the surface layer, the material properties, and the processing conditions specific to the application. Compressive residual stresses typically extend as deep or deeper than about 0.040 to about 0.060 inches (about 1.0 to about 1.5 mm) into the surface, and can approach the yield strength of the material.

Laser peening typically requires line-of-sight access to the surface of the workpiece to be treated. In laser peening operations, it is sometimes necessary to laser peen surfaces that may not be readily processed using traditional laser peening apparatuses. For example, some surfaces are hidden, or out of direct line-of-sight, and as such are not able to be exposed to a laser beam generated from outside the workpiece. Such surfaces may include, for example, inside holes, notches, grooves, internal cavities, dovetail joints, and the like. Previous attempts at laser peening such hidden surfaces have required the insertion of a reflective element into the cavity adjacent to the hidden surface, and directing a laser pulse onto the reflective element, which redirects the pulse onto the hidden surface. However, this method requires additional steps and, thus, additional time to laser peen hidden surfaces. What is needed is a laser peening apparatus that is capable of accessing these hidden surfaces and directly applying a laser pulse thereto.

SUMMARY

In one embodiment, a laser processing pen is provided, the laser processing pen comprising: an elongated member, comprising: a laser pulse entry portion, and a laser pulse exit portion, wherein the laser pulse exit portion includes at least one optical lens.

In one embodiment, an apparatus for laser peening a workpiece is provided, the apparatus comprising: a laser beam source; a beam delivery system; a laser processing pen; and an overlay application system.

In one embodiment, an apparatus for laser peening a workpiece is provided, the apparatus comprising: a laser beam source; a beam delivery system comprising an articulated arm; and a laser processing pen operatively connected to an overlay application system.

BRIEF DESCRIPTION OF THE DRAWINGS

The accompanying figures, which are incorporated in and constitute a part of the specification, illustrate various example systems, methods, and results, and are used merely to illustrate various example embodiments.

DETAILED DESCRIPTION

Figure 1:
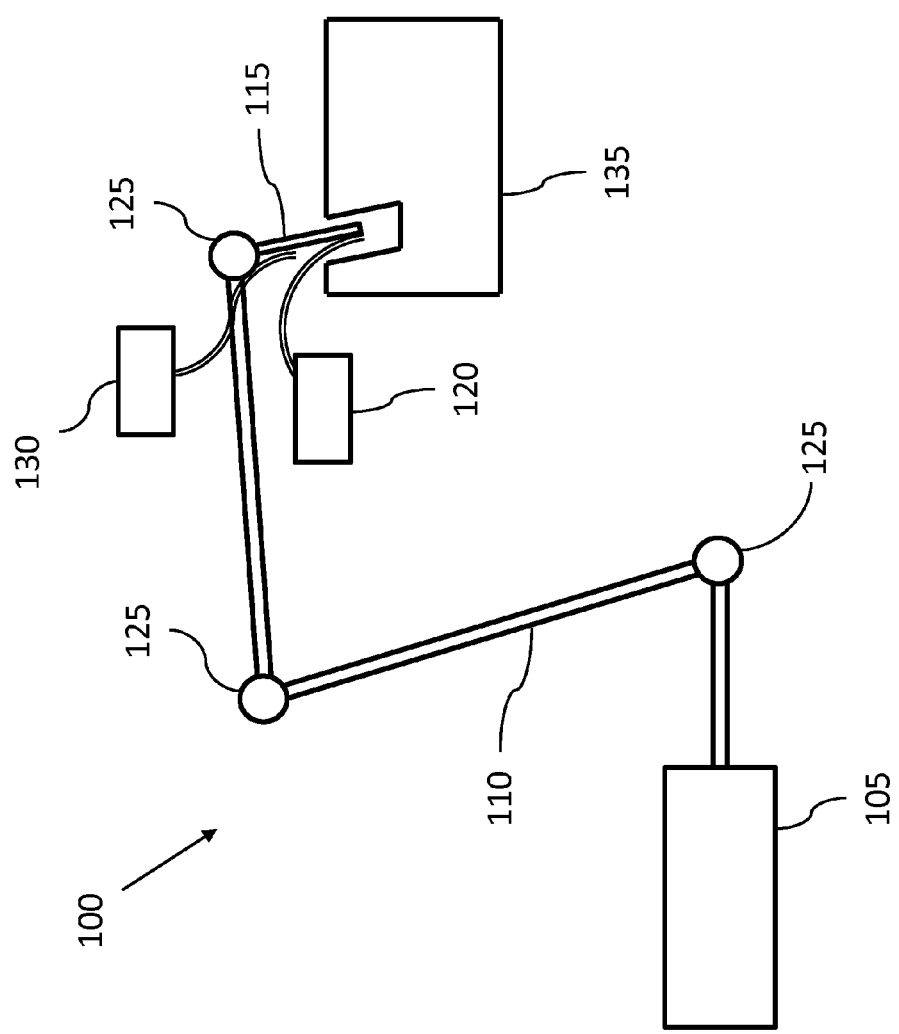
FIG. 1 illustrates an example arrangement of an apparatus for laser peening a workpiece.

FIG. 1 illustrates one embodiment of an apparatus 100 for laser peening a workpiece. Apparatus 100 includes a laser beam source 105, a beam delivery system 110, a laser processing pen 115, an opaque overlay application system 120, at least one pivoting device 125, and a transparent overlay application system 130. Laser beam source 105 may be any suitable laser beam source including, for example, those disclosed in U.S. Pat. No. 6,373,876. In one embodiment, laser beam source 105 is a high-repetition rate laser system.

Beam delivery system 110 may be operatively connected to laser beam source 105. In one embodiment, beam delivery system 110 comprises an elongated member that is at least partially hollow. In another embodiment, beam delivery system 110 comprises an elongated member capable of at least substantially enclosing a laser beam. In another embodiment, beam delivery system 110 comprises an elongated member capable of guiding a laser beam. In another embodiment, beam delivery system 110 comprises an elongated arm member configured to pivot about at least one axis via pivoting device 125. Pivoting device 125 may comprise a hinge, ball and socket, joint, or any other suitable pivoting device. In another embodiment, beam delivery system 110 comprises an elongated arm member configured to pivot about multiple axes. For example, the elongated arm member may be configured to pivot about one or more of the x-axis, y-axis, and z-axis. In another embodiment, beam delivery system 110 comprises an articulated arm, configured to pivot, rotate, or both, at a plurality of points about a plurality of axes. In one embodiment, beam delivery system 110 comprises an elongated arm member configured to extend or contract longitudinally, so as to increase or decrease in length. In one embodiment, beam delivery system 110 may comprise mirrors to direct a laser beam through pivoting device 125. In another embodiment, beam delivery system 110 may comprise a fiber optic device, including at least one fiber optic cable to direct a laser beam through pivoting device 125. Beam delivery system 110 may be constructed from a variety of materials, including metals, polymers, alloys, composites, and any other suitable material.

Laser processing pen 115 may be operatively connected to beam delivery system 110. Laser processing pen 115 may comprise an elongated member. Various embodiments of laser processing pen 115 are disclosed below with regard to FIGS. 2 and 3.

In one embodiment, the apparatus comprises an overlay application system. In one embodiment, the overlay application system comprises an opaque overlay application system, such as opaque overlay application system 120. In another embodiment, the overlay application system comprises a transparent overlay application system, such as transparent overlay application system 130. In yet another embodiment, the overlay application system comprises both an opaque overlay application system and a transparent overlay application system. The overlay application system may be configured to selectively apply an opaque overlay and a transparent overlay, either simultaneously or consecutively. In one embodiment, the overlay application system comprises a wetting fluid, which capable of enhancing cohesion between a tape overlay and a workpiece. In such an embodiment, the wetting fluid may be applied to either the tape overlay, or the workpiece. In another embodiment, the wetting fluid may be a component of either opaque overlay application system 120, transparent overlay application system 130, or both.

Opaque overlay application system 120 may comprise any system for applying opaque overlay, including, for example, the systems and apparatuses disclosed in U.S. Pat. Nos. 5,741, 559 and 7,268,317. In one embodiment, opaque overlay application system 120 applies a black paint overlay. In another embodiment, opaque overlay application system 120 applies a liquid energy-absorbing overlay that is resistant to drying and dissolution by a transparent overlay. In one embodiment, opaque overlay application system 120 delivers opaque overlay to the workpiece 135 via a nozzle located in the proximity of laser processing pen 115 before application of a laser pulse to workpiece 135. This nozzle may be operatively connected to laser processing pen 115. In another embodiment, opaque overlay application system 120 applies opaque overlay to workpiece 135 before laser peening. In yet another embodiment, opaque overlay application system 120 applies opaque overlay to workpiece 135 before application of a laser pulse to the workpiece.

In one embodiment, opaque overlay application system 120 applies a tape overlay. In another embodiment, the tape overlay is a non-adhesive tape overlay. In another embodiment, opaque overlay application system 120 comprises a system wherein tape overlay travels from a first reel (not shown), to a position near laser processing pen 115 where it is exposed to a laser beam, and onto a second reel (not shown). In this embodiment, opaque overlay application system 120 may also comprise at least one automatic tape advancing device (not shown) capable of advancing the tape overlay from the first reel to the second reel. Opaque overlay application system 120 may further comprise at least one automatic tape advancing system configured to index the tape overlay a short distance prior to each application of a laser pulse to workpiece 135. Further, this embodiment may also comprise at least one tape tensioning device (not shown) capable of maintaining appropriate tension in a tape overlay. The at least one tape tensioning device may be capable of maintaining appropriate tension in a tape overlay when the tape overlay is stationary, in motion, or both. In another embodiment, the at least one tape tensioning device is capable of maintaining the tape overlay in intimate contact with workpiece 135. For example, the tape tensioning device might apply a tension in the tape overlay across a span created by two or more elements of laser processing pen 115. Laser processing pen 115 may then be positioned adjacent to workpiece 135 such that workpiece 135 falls between, and across the plane created by, the two or more elements of laser processing pen 115, thus forcing the tape overlay to stay in intimate contact with workpiece 135. In another embodiment, the first and/or second reels may be replaced with containers, spools, or eliminated altogether. In another embodiment, tape overlay is stored on or in any number of devices.

Transparent overlay application system 130 may apply a transparent overlay to at least one of the opaque overlay, workpiece 135, the laser processing pen's optical lens (described below with regard to FIG. 2), or the laser pulse exit portion (described below with regard to FIG. 2). In one embodiment, transparent overlay application system 130 applies a liquid. In another embodiment, transparent overlay application system 130 applies water. In another embodiment, transparent overlay application system 130 is operatively connected to laser processing pen 115. In one embodiment, transparent overlay application system 130 delivers transparent overlay to the opaque overlay, workpiece 135, the laser processing pen's optical lens, or the laser pulse exit portion via a nozzle located in the proximity of laser processing pen 115 before application of a laser pulse to workpiece 135. This nozzle may be operatively connected to laser processing pen 115. In another embodiment, transparent overlay application system 130 applies transparent overlay to the opaque overlay, workpiece 135, the laser processing pen's optical lens, or the laser pulse exit portion prior to laser peening.

Figure 2:
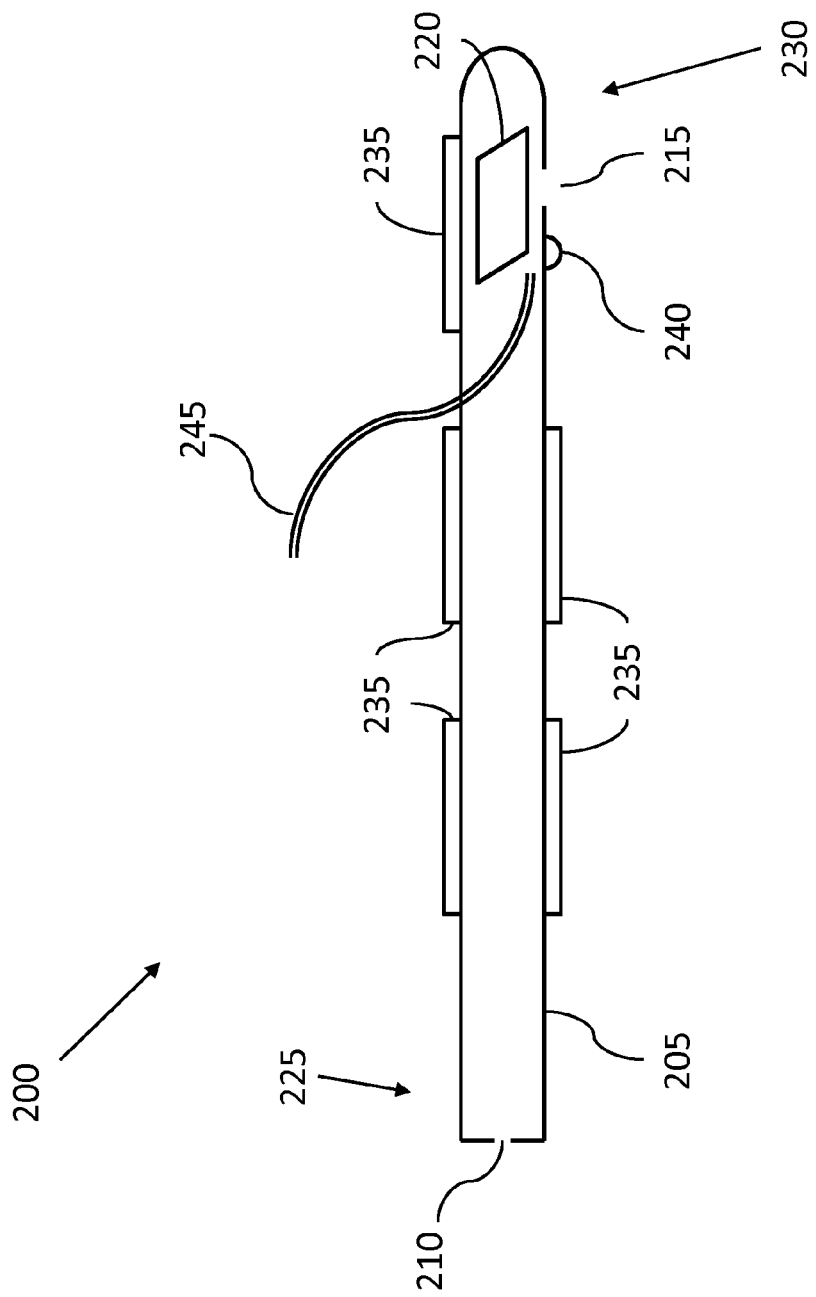
FIG. 2 illustrates an example arrangement of a laser processing pen.

FIG. 2 illustrates one embodiment of a laser processing pen 200. Laser processing pen 200 comprises an elongated member 205 which comprises a laser pulse entry portion 210 and a laser pulse exit portion 215. In one embodiment, laser pulse entry portion 210 is operatively connected to the beam delivery system. Laser pulse exit portion 215 may comprise at least one optical lens 220. In one embodiment, elongated member 205 comprises a substantially cylindrical and at least partially hollow tube. In another embodiment, elongated member 205 may have any suitable cross-section. In one embodiment, elongated member 205 has a cross-sectional outside diameter of less than about 20 mm. Elongated member 205 may be constructed from a variety of materials, including metals, polymers, alloys, composites, and any other suitable materials.

In one embodiment, laser pulse entry portion 210 is a perforation in elongated member 205 having a size and shape configured to allow a laser beam to pass through uninhibited. In another embodiment, laser pulse entry portion 210 may be a lens or window capable of transmitting a laser beam. In one embodiment, laser pulse exit portion 215 is a perforation in elongated member 205 having a size and shape configured to allow a laser beam to pass through uninhibited. In another embodiment, laser pulse exit portion 215 may be a lens or window capable of transmitting a laser beam.

In one embodiment, optical lens 220 is capable of focusing a laser beam such that the beam has at least one of a circular cross section, an elliptical cross section, and a rectangular cross-section. However, optical lens 220 may also be capable of focusing a laser beam in such a manner as to create any cross section desired (e.g., rectangular, including square, or hexagonal). In one embodiment, laser processing pen 200 includes a plurality of optical lenses, including at least one spherical lens, and at least one cylindrical lens. In one embodiment, the at least one optical lens 220 has a diameter of less than about 10 mm. In another embodiment, the at least one optical lens 220 has a diameter between about 2 mm and about 10 mm. In another embodiment, the at least one optical lens 220 has a diameter between about 3 mm and about 8 mm. In yet another embodiment, the at least one optical lens 220 has a diameter between about 4 mm and about 6 mm.

With continued reference to FIG. 2, laser processing pen 200 may comprise an elongated member 205 having at least a proximal end 225 and a distal end 230. In one embodiment, laser pulse entry portion 210 is located near proximal end 225. In another embodiment, laser pulse exit portion 215 is located near distal end 230.

In one embodiment, elongated member 205 comprises at least one tape guide 235. In one embodiment, at least one tape guide 235 is configured to channel at least a tape overlay. In another embodiment, at least one tape guide 235 is configured to channel at least a non-adhesive tape overlay. In another embodiment, at least one tape guide 235 is configured to channel at least a tape overlay in the proximity of laser pulse exit portion 215. At least one tape guide 235 may be operatively connected to elongated member 205, and configured to channel a tape overlay longitudinally along the exterior of elongated member 205. In one embodiment, at least one tape guide 235 is configured to guide tape overlay from proximal end 225 of elongated member 205 to distal end 230 of elongated member 205 and between laser pulse exit portion 215 and a workpiece surface. In yet another embodiment, at least one tape guide 235 is configured to channel tape overlay continuously along elongated member 205, around distal end 230, and between laser pulse exit portion 215 and a workpiece surface. In another embodiment, the tape overlay is advanced through at least one tape guide 235 along elongated member 205 by an opaque overlay application system comprising at least one automatic tape advancing device.

In one embodiment, elongated member 205 comprises at least one spacing apparatus 240. In one embodiment, the at least one spacing apparatus 240 is located in the proximity of laser pulse exit portion 215. In another embodiment, at least one spacing apparatus 240 is configured to create a desired space between laser pulse exit portion 215 and a workpiece surface. In one embodiment, spacing apparatus 240 includes at least one spacer, which can include any device capable of maintaining a particular desired spacing, a maximum spacing, or a minimum spacing between elongated member 205 and the workpiece. For example, the at least one spacer can be configured to: maintain a desired spacing between laser pulse exit portion 215 and the workpiece surface, maintain a desired spacing between laser pulse exit portion 215 and a non-adhesive tape overlay, or both. In one embodiment, spacing apparatus 240 includes at least one spacing ball configured to offset tape overlay away from laser pulse exit portion 215 at an appropriate distance, or range of distances. The at least one spacing ball may be integrated into elongated member 205. In another embodiment, tape overlay is channeled between the at least one spacing ball and a workpiece surface. The at least one spacing ball may provide a low-friction surface over which a tape overlay may be channeled. In one embodiment, the at least one spacing ball is a ruby ball. In another embodiment, the at least one spacing ball is biased away from elongated member 205 and toward a workpiece surface. Biasing may be achieved through the use of any biasing device commonly understood in the art, including without limitation a spring. In another embodiment, the at least one biased spacing ball is configured to keep an opaque overlay in intimate contact with a workpiece surface during laser peening. In one embodiment, at least one spacing apparatus 240 may be positioned between laser pulse exit portion 215 and proximal end 225. In another embodiment (not shown), at least one spacing apparatus 240 may be positioned between laser pulse exit portion 215 and distal end 230. In yet another embodiment (not shown), a plurality of spacing apparatuses 240 may be used, and positioned both between laser pulse exit portion 215 and proximal end 225, and between laser pulse exit portion 215 and distal end 230.

Elongated member 205 may further comprise at least one capillary tube 245 configured to deliver a liquid, such as a transparent overlay, onto at least one of optical lens 220, the opaque overlay, laser pulse exit portion 215, and the workpiece surface. As described above in reference to FIG. 1, a transparent overlay may be applied to one or more of optical lens 220, opaque overlay, laser pulse exit portion 215, and workpiece surface during laser peening. In one embodiment, at least one capillary tube 245 may be operatively connected to the transparent overlay application system (described above in reference to FIG. 1). In one embodiment, at least one capillary tube 245 may be integrally incorporated into elongated member 205. In another embodiment, at least one capillary tube 245 is configured to deliver a liquid to the surface of at least one optical lens 220 to flush debris and bubbles therefrom. In another embodiment, at least one capillary tube 245 is configured to deliver a liquid to the surface of at least one optical lens 220 to protect optical lens 220 from debris ejected from the workpiece surface. In another embodiment, at least one capillary tube 245 is configured to deliver a liquid, such as transparent overlay, to the opaque overlay prior to laser peening. In another embodiment, at least one capillary tube 245 is configured to deliver a liquid to laser pulse exit portion 215 to flush debris therefrom. In yet another embodiment (not shown), a plurality of capillary tubes 245 are employed, configured to deliver a liquid onto one or more of optical lens 220, the opaque overlay, laser pulse exit portion 215, and the workpiece surface.

Figure 3:
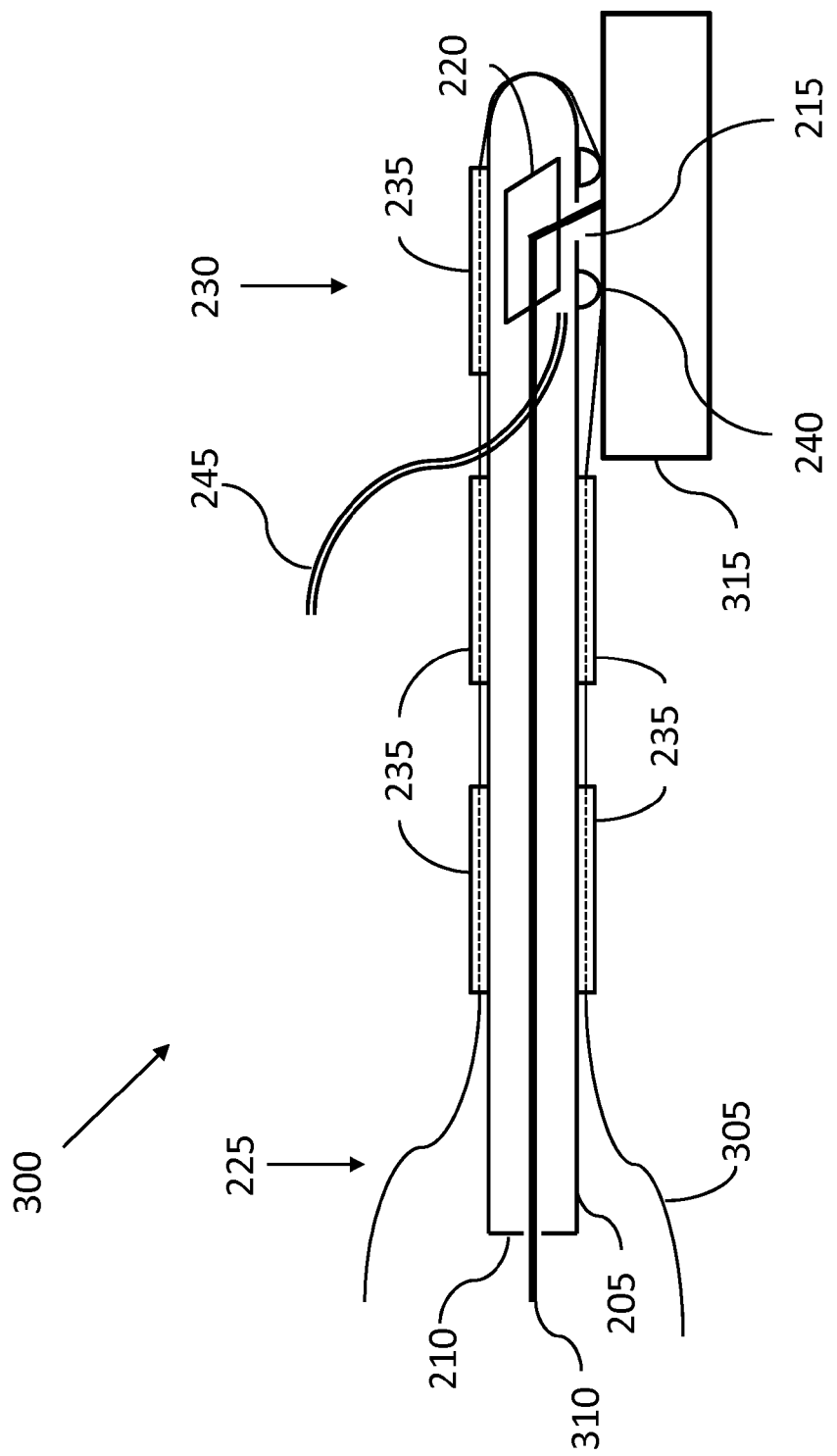
FIG. 3 illustrates another example arrangement of a laser processing pen.

FIG. 3 illustrates another example embodiment of a laser processing pen 300. Laser processing pen 300 is similar to laser processing pen 200 illustrated in FIG. 2. Like components are referred to by like reference numerals.

In this example embodiment, elongated member 205 includes multiple tape guides 235 about its periphery. Elongated member 205 further comprises a plurality of spacing apparatuses 240 positioned on either side of laser pulse exit portion 215. Laser processing pen 300 further comprises a tape overlay 305, channeled through tape guides 235, and between spacing apparatuses 240 and a surface of a workpiece 315. In one example embodiment, tape overlay 305 advances from a first reel of opaque overlay application system (not shown), through tape guides 235, and onto a second reel of opaque overlay application system (not shown). In another embodiment, at least one tape tensioning device (not shown) may be utilized to maintain a desired tension in tape overlay 305 as it traverses through tape guides 235.

With continued reference to FIG. 3, a laser pulse 310 is illustrated traveling through laser pulse entry portion 210 and into one or more optical lens 220, which redirects laser pulse 310 out laser pulse exit portion 215 and onto tape overlay 305.

With regard to FIGS. 1, 2, and 3, in one embodiment, the apparatus 100 as described above is employed in a method for laser peening a workpiece, wherein apparatus 100 is selectively positioned in reference to the workpiece. Laser processing pen 200, 300, as described above is positioned such that the at least one optical lens 220 and laser pulse exit portion 215 are adjacent to a workpiece surface with a desired spacing. Such desired spacing may be maintained by one or more spacing apparatuses 240. After laser processing pen 200, 300 are in a desired position, opaque overlay application system 120 applies an opaque overlay between at least one optical lens 220 and the workpiece surface. Upon application of an opaque overlay, a laser pulse from laser beam source 105 is directed along beam delivery system 110, into laser processing pen 200, 300, and onto the workpiece surface.

In another embodiment, the method for laser peening a workpiece further comprises application of a transparent overlay via transparent overlay application system 130 and capillary tube 245 at least between the at least one optical lens 220 and the opaque overlay. In another embodiment, the method further comprises applying a transparent overlay via transparent overlay application system 130 to the surface of at least one optical lens 220. Such application of transparent overlay to the surface of at least one optical lens 220 may act to wash debris from the surface of the optical lens, remove contaminants from the air between the optical lens and the workpiece, or both. In yet another embodiment, the method comprises applying a transparent overlay via transparent overlay application system 130 to one or more of laser pulse exit portion 215 and a workpiece surface to clear contaminants or obstructive particles from the same.

In another embodiment, opaque overlay application system 120 utilized in the method applies a tape overlay 305 and further comprises at least one automatic tape advancing device (not shown), capable of automatically advancing tape overlay 305 adjacent to laser processing pen 200, 300 during laser peening. In another embodiment, the method further comprises the step of advancing tape overlay 305 between at least one optical lens 220 and a workpiece surface. In still another embodiment, opaque overlay application system 120 comprises at least one tape tensioning device (not shown) and the method further comprises the step of maintaining appropriate tension in tape overlay 305 during laser peening.

With continued reference to FIGS. 1, 2, and 3, in one embodiment the method further comprises the step of advancing tape overlay 305 along elongated member 205 though at least one tape guide 235. In another embodiment, laser processing pen 200, 300 includes at least one spacing apparatus 240, which maintains desired spacing between at least one optical lens 220 and the workpiece surface. In another embodiment, at least one spacing apparatus 240 is configured to maintain desired spacing between at least one optical lens 220 and tape overlay 305. In yet another embodiment, at least one spacing apparatus 240 is configured to press tape overlay 305 into intimate contact with the workpiece surface, in at least the proximity of laser exit portion 215, such that tape overlay 305 intimately contacts the workpiece surface when a laser pulse is applied to tape overlay 305.

In one embodiment, a method for laser peening a workpiece comprises the steps of positioning laser processing pen 200, 300 such that at least one optical lens 220 and laser pulse exit portion 215 are adjacent to a workpiece surface, with a desired spacing between laser pulse exit portion 215 and the workpiece surface maintained by one or more spacing apparatus 240. This method further comprises the positioning of tape overlay 305 between one or more spacing apparatus 240 and the workpiece surface, such that one or more spacing apparatus 240 maintains tape overlay 305 in intimate contact with the workpiece surface. Upon positioning laser processing pen 200, 300 as described, a laser pulse 310 is generated by laser beam source 105, directed along beam delivery system 110, into laser processing pen 200, 300, through at least one optical lens 220, and onto tape overlay 305. Following delivery of this laser pulse, opaque overlay application system 120 advances tape overlay 305 a specified distance using a tape advancing device (not shown) while maintaining a desired tension in tape overlay 305 using a tape tensioning device (not shown). This advancing of tape overlay 305 is configured to present a portion of tape overlay 305 that has not been previously exposed to laser pulse 310, and wherein tape overlay 305 continues to be pressed into intimate contact with the workpiece surface by one or more spacing apparatus 240. In this embodiment, opaque overlay application system 120 advances tape overlay 305 by indexing tape overlay 305 a desired distance between laser pulses. In another embodiment, opaque overlay application system 120 continuously advances tape overlay 305 at a desired rate, which may be constant or near-constant. In another embodiment, the method may further comprise the step of applying a transparent overlay from transparent overlay application system 130 and through at least one capillary tube 245, immediately before application of laser pulse 310. In another embodiment, transparent overlay application system 130 applies the transparent overlay after application of laser pulse 310. In yet another embodiment, transparent overlay application system 130 applies the transparent overlay constantly before, during, and after application of laser pulse 310.

Unless specifically stated to the contrary, the numerical parameters set forth in the specification, including the attached claims, are approximations that may vary depending on the desired properties sought to be obtained according to the example embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, apparatuses, and so on have been illustrated by describing example embodiments, and while the example embodiments have been described and illustrated in considerable detail, it is not the intention of the applicant to restrict, or in any way, limit the scope of the appended claims to such detail. It is, of course, not possible to describe every conceivable combination of components or methodologies for purposes of describing the systems, methods, apparatuses, and so on provided herein. Additional advantages and modifications will readily appear to those skilled in the art. Therefore, the invention, in its broader aspects, is not limited to the specific details and illustrative embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. To the extent that the term "operatively connected" is employed in the detailed description or claims, it is intended to mean that the identified components are connected in a way to perform a designated function. To the extent that the term "selectively" is employed in the detailed description, it is intended to identify a condition of a component wherein an operator of the apparatus or software configured to control the apparatus may activate or deactivate the feature or function of the component as is necessary or desired in use of the apparatus. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A laser processing pen, comprising:
   an elongated member, comprising:
      a laser pulse entry portion;
      a laser pulse exit portion, wherein the laser pulse exit portion includes at least one optical lens;
      at least two tape guides attached to a periphery of the elongated member, each of the at least two tape guides each comprising a peripheral edge and a channel between the peripheral edge and the elongated member, the channel capable of guiding at least a non-adhesive tape overlay longitudinally along the elongated member, around a distal end of the elongated member, and in proximity of the laser pulse exit portion; and
      at least one spacer configured to create a desired space between the laser pulse exit portion and a workpiece surface.

2. The laser processing pen of claim 1, wherein the optical lens is capable of focusing a laser pulse to at least one of a circular, an elliptical, and a rectangular cross-section.

3. The laser processing pen of claim 1, wherein the at least one optical lens has a diameter between 2 mm and 10 mm.

4. The laser processing pen of claim 1, further comprising at least one capillary tube capable of applying a transparent overlay to at least one of a workpiece surface, an opaque overlay, the at least one optical lens, and the laser pulse exit portion.

5. The laser processing pen of claim 1, wherein the at least one spacer comprises a spacing ball.

6. The laser processing pen of claim 1, wherein the at least one spacer comprises a spring biasing device.

7. An apparatus for laser peening a workpiece, comprising:
   a laser beam source;
   a beam delivery system;
   a laser processing pen;
   an overlay application system;
   at least two tape guides attached to a periphery of the laser processing pen, each of the at least two tape guides comprising a peripheral edge and a channel between the peripheral edge and the laser processing pen, the channel capable of guiding at least a non-adhesive tape overlay longitudinally along the laser processing pen, and around a distal end of the laser processing pen; and
   at least one spacing apparatus capable of maintaining a desired spacing between the laser processing pen and the tape overlay.

8. The apparatus of claim 7, wherein the beam delivery system comprises an articulated arm.

9. The apparatus of claim 7, wherein the laser processing pen comprises at least one optical lens having a diameter between 2 mm and 10 mm.

10. The apparatus of claim 7, wherein the overlay application system comprises a transparent overlay system.

11. The apparatus of claim 7, wherein the overlay application system comprises an opaque overlay application system comprising at least one automatic tape advancing device capable of advancing a tape overlay adjacent to the laser processing pen.

12. The apparatus of claim 7, wherein the beam delivery system comprises a fiber optic device.

13. The apparatus of claim 7, wherein the at least one spacing apparatus comprises a spring biasing device.

14. An apparatus for laser peening a workpiece, comprising:
   a laser beam source;
   a beam delivery system;
   a laser processing pen operatively connected to an overlay application system; and
   at least two tape guides attached to a periphery of the laser processing pen, each of the at least two tape guides comprising a peripheral edge and a channel between the peripheral edge and the laser processing pen, the channel capable of guiding at least a non-adhesive tape overlay longitudinally along the laser processing pen, and around a distal end of the laser processing pen.

15. The apparatus of claim 14, wherein the beam delivery system comprises an articulated arm configured to pivot about at least one axis.

16. The apparatus of claim 14, wherein the laser processing pen comprises at least one optical lens having a diameter of less than about between 2 mm and 10 mm.

17. The apparatus of claim 14, wherein the overlay application system comprises a transparent overlay application system.

18. The apparatus of claim 14, wherein the overlay application system comprises an opaque overlay application system.

19. The apparatus of claim 14, wherein the overlay application system comprises an opaque overlay application system, the opaque overlay application system comprising at least one automatic tape advancing device capable of advancing a tape overlay adjacent to the laser processing pen.

20. The apparatus of claim 14, wherein the beam delivery system comprises a fiber optic device.

* * * * *